US012780607B2

(12) United States Patent
Barnave

(10) Patent No.: US 12,780,607 B2
(45) Date of Patent: Nov. 3, 2026

(54) ELEVATOR BLANKET AND SOUND PROOFING COVER

(71) Applicant: Jean Craig Barnave, Laurelton, NY (US)

(72) Inventor: Jean Craig Barnave, Laurelton, NY (US)

( * ) Notice: Subject to any disclaimer, the term of this patent is extended or adjusted under 35 U.S.C. 154(b) by 0 days.

(21) Appl. No.: 19/046,105

(22) Filed: Feb. 5, 2025

(65) Prior Publication Data

US 2025/0250143 A1 Aug. 7, 2025

Related U.S. Application Data

(60) Provisional application No. 63/550,598, filed on Feb. 6, 2024.

(51) Int. Cl.

*B66B 11/02* (2006.01)
*B32B 3/26* (2006.01)
*B32B 5/18* (2006.01)
*B32B 27/06* (2006.01)
*B32B 27/30* (2006.01)

(52) U.S. Cl.

CPC .......... *B66B 11/0253* (2013.01); *B32B 3/266* (2013.01); *B32B 5/18* (2013.01); *B32B 27/065* (2013.01); *B32B 27/304* (2013.01); *B32B 2250/03* (2013.01); *B32B 2250/40* (2013.01); *B32B 2307/102* (2013.01); *B32B 2307/7265* (2013.01)

(58) Field of Classification Search

CPC . B66B 11/0253; B66B 11/0226; B32B 3/266; B32B 5/18; B32B 27/065; B32B 27/304; B32B 2250/03; B32B 2250/40; B32B 2307/102; B32B 2307/7265

See application file for complete search history.

(56) References Cited

U.S. PATENT DOCUMENTS

| | | | | |
|---|---|---|---|---|
| 4,924,973 | A * | 5/1990 | Miller | B66B 11/0226 160/368.1 |
| 10,392,228 | B2 * | 8/2019 | Miller | A47H 1/18 |
| 12,054,357 | B2 * | 8/2024 | Malloy | B66B 11/0226 |
| 2008/0121349 | A1 * | 5/2008 | De La Cruz | E06B 9/18 160/23.1 |
| 2014/0255639 | A1 * | 9/2014 | Miller | D06C 7/00 28/165 |

* cited by examiner

*Primary Examiner* — Diem M Tran
(74) *Attorney, Agent, or Firm* — Collard & Roe, P.C.

(57) ABSTRACT

An elevator cover comprising a body section, said body section having a top edge and a bottom edge and left and right-side edges and an interior portion. There is also a strap coupled to the body section, wherein the strap has a top end coupled to a top edge of the body section and a bottom edge coupled to the interior portion of the body section and a plurality of openings disposed in the strap with the openings being disposed below the top edge of the body section. There is also a process for making a cover comprising the steps of making a first layer from a polymer material and then making a middle layer from a foam material, next making a third layer from a polymer material. Next the process includes joining a first layer to a middle layer, and then joining the third layer to the middle layer.

9 Claims, 7 Drawing Sheets

FIG. 3A
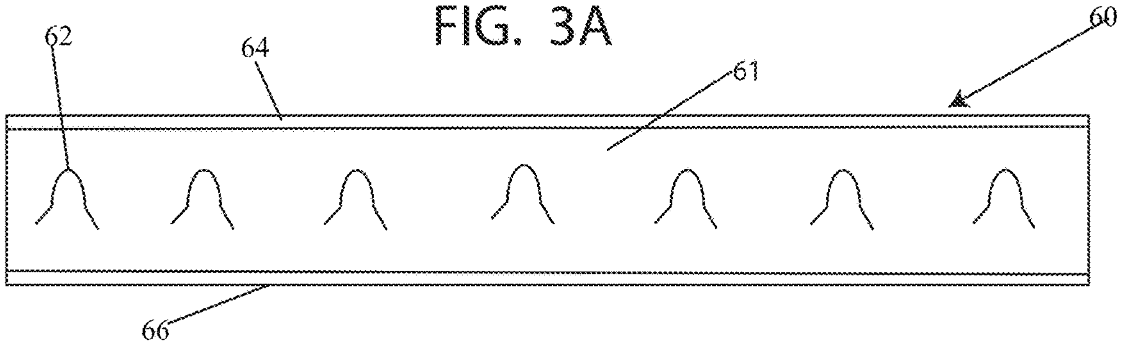
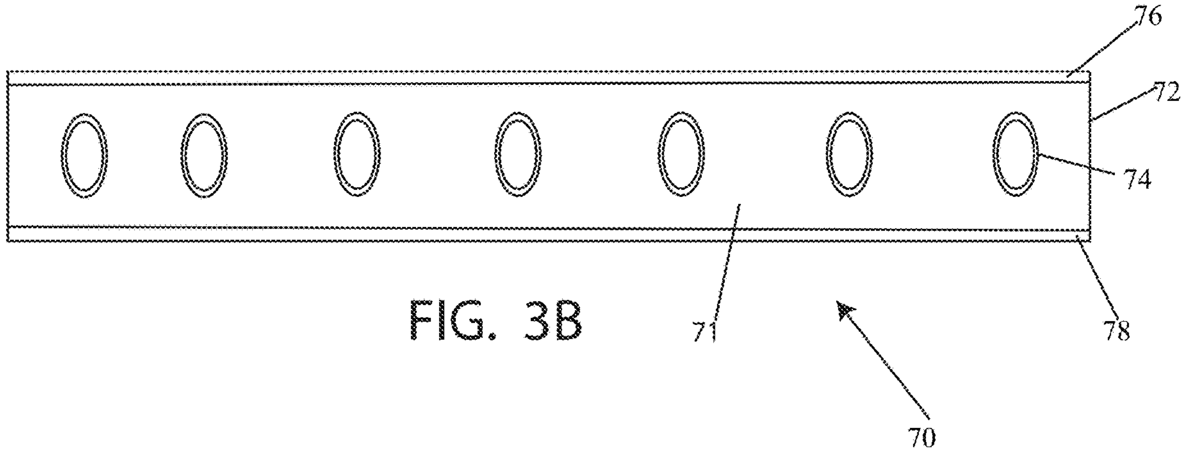
FIG. 3B

ELEVATOR BLANKET AND SOUND PROOFING COVER

CROSS REFERENCE TO RELATED APPLICATIONS

This application is a non-provisional application that hereby claims priority from Provisional Application Ser. No. 63/550,598 filed on Feb. 6, 2024, the disclosure of which is incorporated herein by reference in its entirety.

BACKGROUND OF THE INVENTION

The invention relates to an elevator blanket and sound proofing cover. Elevator blankets are used to protect the walls of an elevator when a person is moving furniture or other objects when moved inside of an elevator. Elevator blankets are usually sized and created in a custom manner and sized for a particular elevator size. This requires a lot of custom work in creating individual blankets for a particular elevator. In addition, one embodiment of the invention also relates to a custom soundproofing cover which can be arranged to prevent the transmission of sounds and to instead absorb sound waves to deaden the transmission of sounds.

SUMMARY

An elevator cover comprising a body section, said body section having a top edge and a bottom edge and left and right-side edges and an interior portion. There is also a strap coupled to the body section, wherein the strap has a top end coupled to a top edge of the body section and a bottom edge coupled to the interior portion of the body section and a plurality of openings disposed in the strap with the openings being disposed below the top edge of the body section. There is also a process for making a cover comprising the steps of making a first layer from a polymer material and then making a middle layer from a foam material, next making a third layer from a polymer material. Next the process includes joining a first layer to a middle layer, and then joining the third layer to the middle layer.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 3A is a view of the strap having bell shaped openings;

FIG. 3B is a view of the strap having reinforced openings;

DETAILED DESCRIPTION

Figure 1:
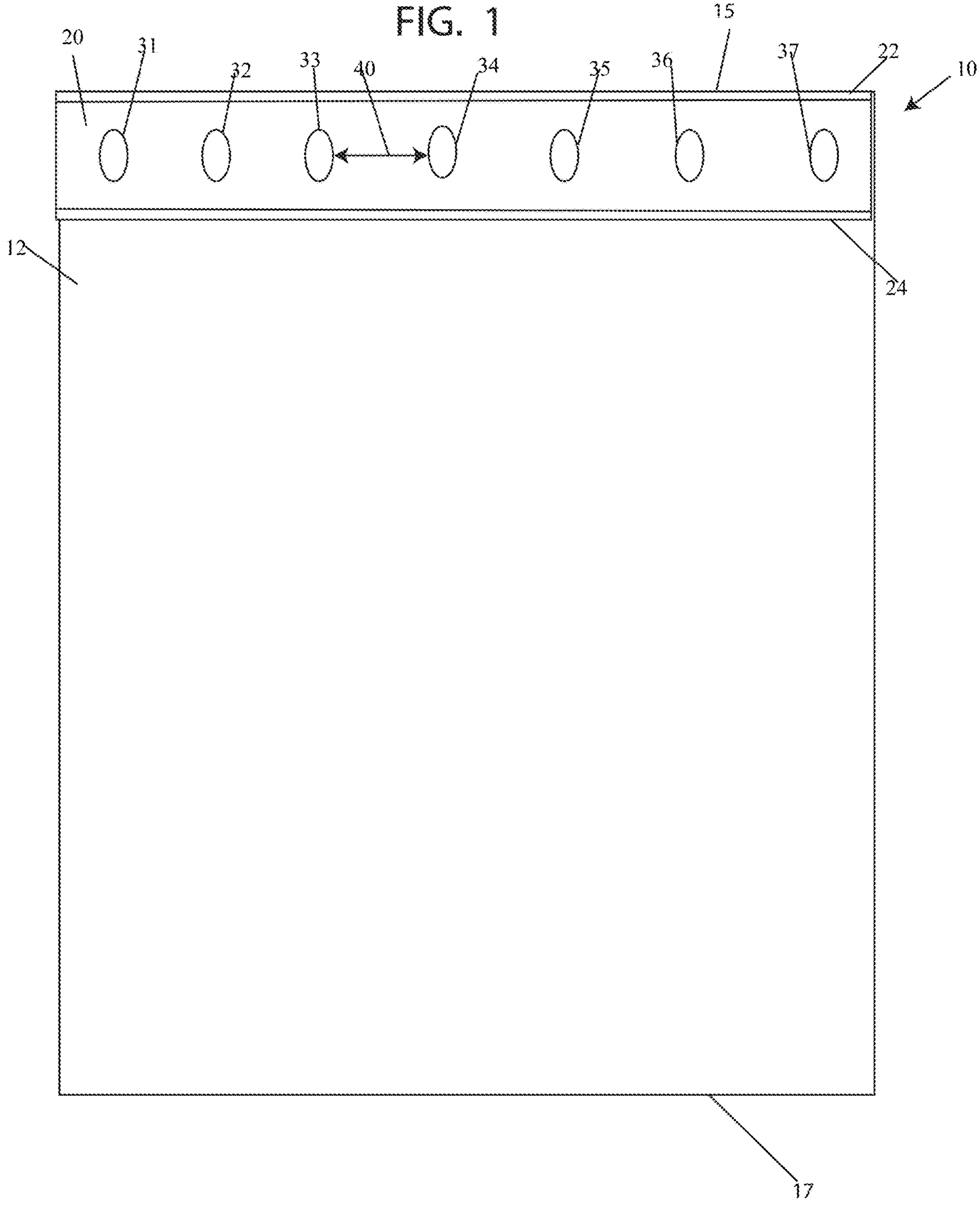
FIG. 1 is a front view of the elevator cover.

FIG. 1 is a front view of the elevator cover 10 having a body section 12 and a strap 20 coupled to the body section. The body section 12 has an upper edge 15 and a bottom edge 17. The strap 20 has an upper edge 22 and a lower edge 24. The upper edge 22 of the strap is coupled to the upper edge 15 of the body section 12. The lower edge 24 of the strap is coupled to an interior region of the body section 12. The strap has a plurality of holes such as holes 31, 32, 33, 34, 35, 36, 37 disposed in the strap. Each of these holes are spaced apart from each other by a distance 40. The distance 40 is calculated as a distance 58 between prongs (See FIG. 2) on an elevator.

Figure 2:
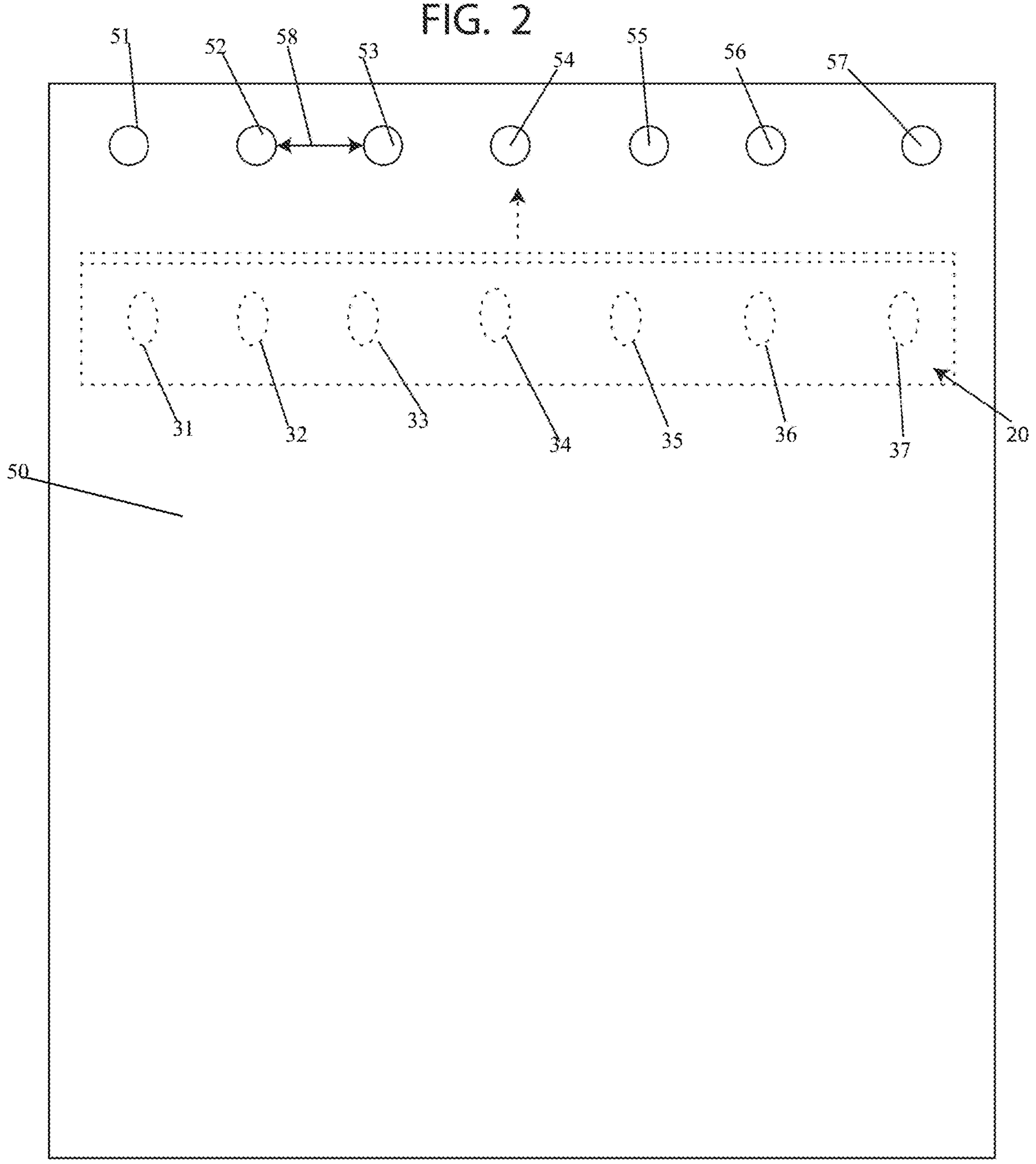
FIG. 2 is a view of a wall of an elevator with the strap being shown in dashed lines.

FIG. 2 is a view of a wall of an elevator with the strap being shown in dashed lines. In this view, the wall of the elevator 50 has a plurality of prongs 51, 52, 53, 54, 55, 56, and 57 coupled thereto. The strap 20 which is part of the elevator cover 10 is shown in dashed dotted lines. The strap is configured so that the holes 31, 32, 33, 34, 35, 36, and 37 are set to fit over associated prongs 51,52, 53, 54, 55, 56, and 57 wherein the spacing 58 is similar to the spacing 40 between the holes.

FIG. 3A is a view of the strap 60 having a strap base section 61 and an upper edge 64 and a bottom edge 66. The strap 60 comprises a plurality of bell shaped openings 62. These bell-shaped openings have a closed top end and an open bottom end. The open bottom end is configured to receive the prongs such as prongs 51, 52, 53, 54, 55, 56 57, on the elevator (See FIG. 2).

FIG. 3B is a view of strap 70 having reinforced openings. The strap 70 includes an upper edge 76 and a lower edge 78. Disposed between the upper edge 76 and the lower edge are reinforced openings 74. These reinforced openings 74 comprise either reinforced stitching or solid material rings disposed in these openings. These rings can be made from metal, plastic, wood, or composite material.

Figure 4:
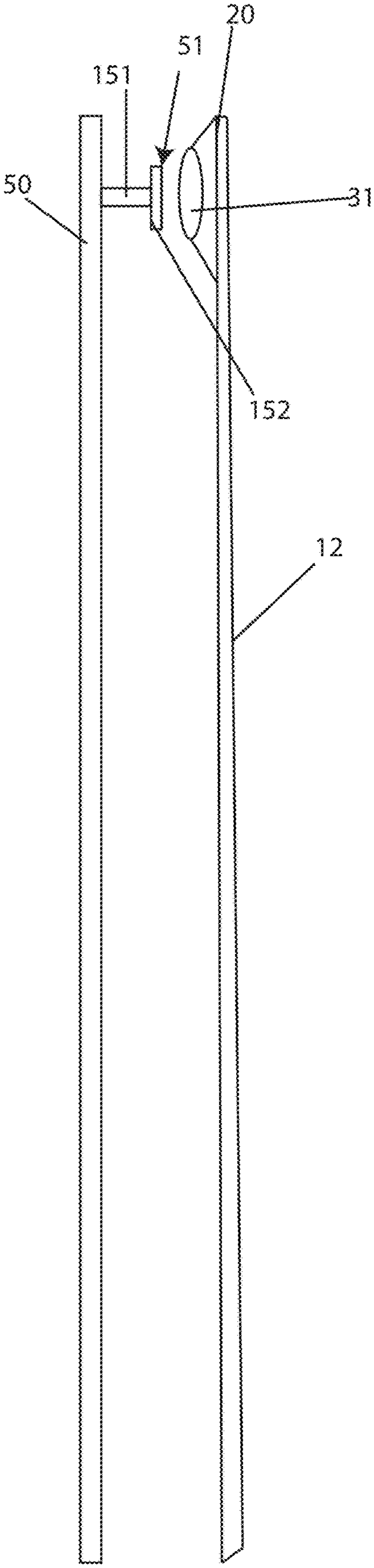
FIG. 4 is a side view of the cover being placed on an elevator having prongs.

FIG. 4 is a side view of the cover being placed on an elevator 50 having prongs such as prong 51. The prongs comprise a stem 151 and a head 152. This view is to show that the strap is configured to be coupled to the prongs. For example, there is shown body section 12 which has strap 20 coupled thereto, wherein each strap has a hole such as hole 31. The hole 31 is shown as being configured to fit over the prong such as prong 51. When each of the holes such as holes 31 are fit over the prongs such as prong 51 it allows the body section 12 to drape down and cover the body of the elevator.

Figure 5A:
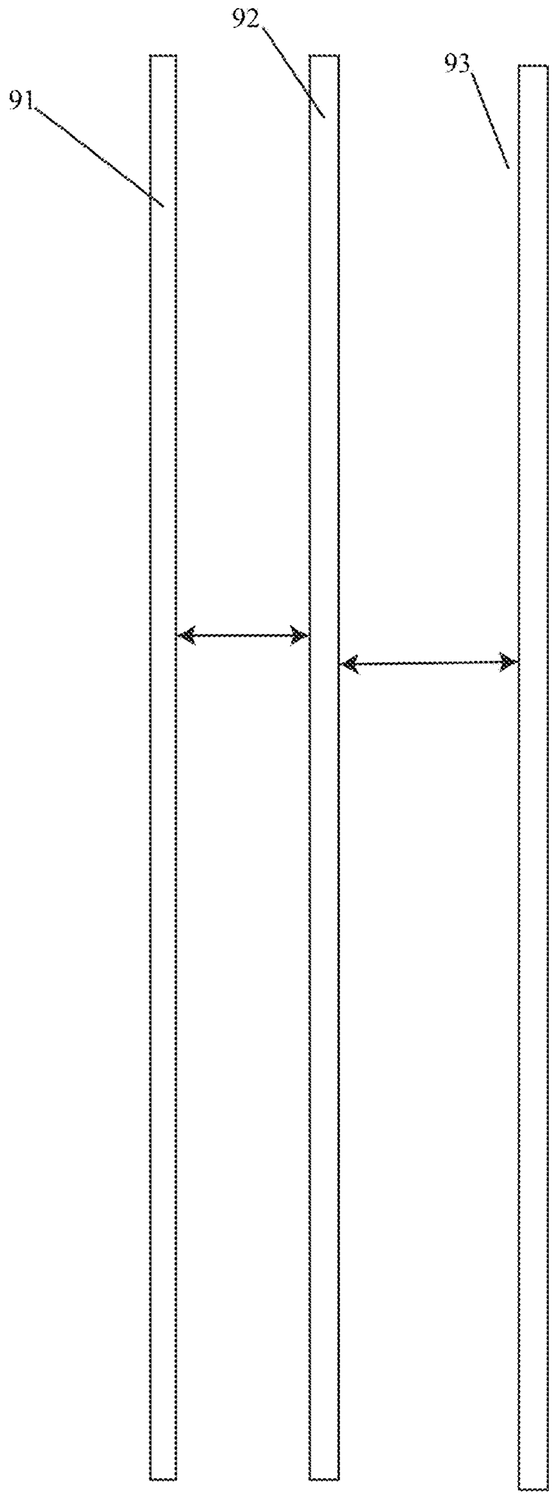
FIG. 5A is a side view of a soundproofing blanket being put together.
Figure 5B:
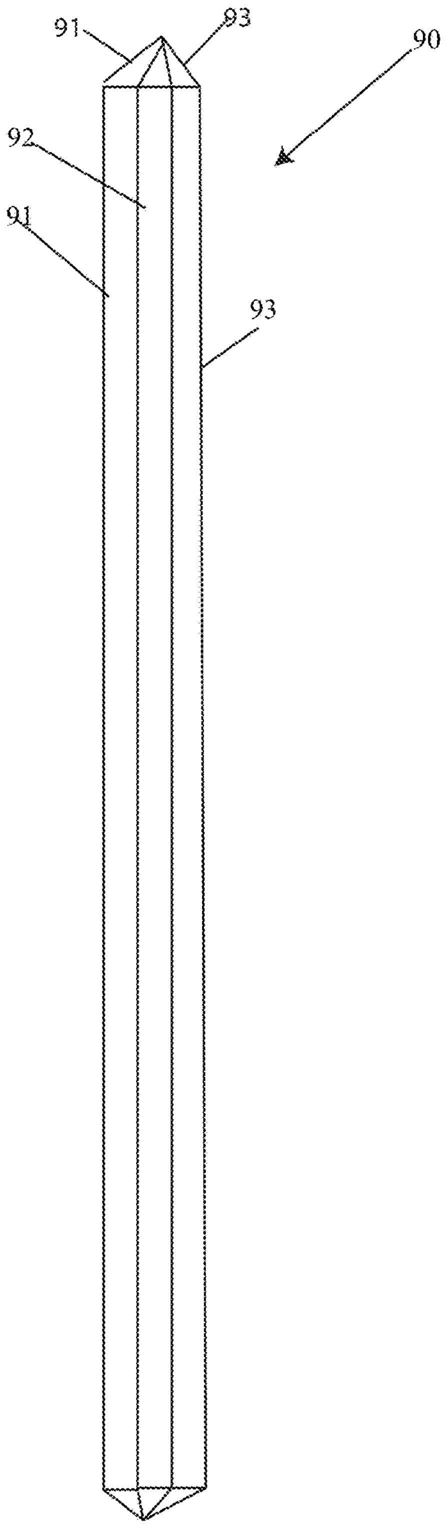
FIG. 5B is a side view of the soundproofing blanket in an assembled form.

FIG. 5A is a side view of a soundproofing blanket being put together. In this view a blanket 90 includes a first outer sheet 91 a middle section 92 and an opposite sheet 93. The sheets can be laminated together so that an upper edge is sealed together with outer sheet 91 being coupled to opposite sheet 93 to form a sealed edge. FIG. 5B shows the different layers sealed together. The sealing of the edge can be through a suitable sealing technique such as through welding.

Figure 6:
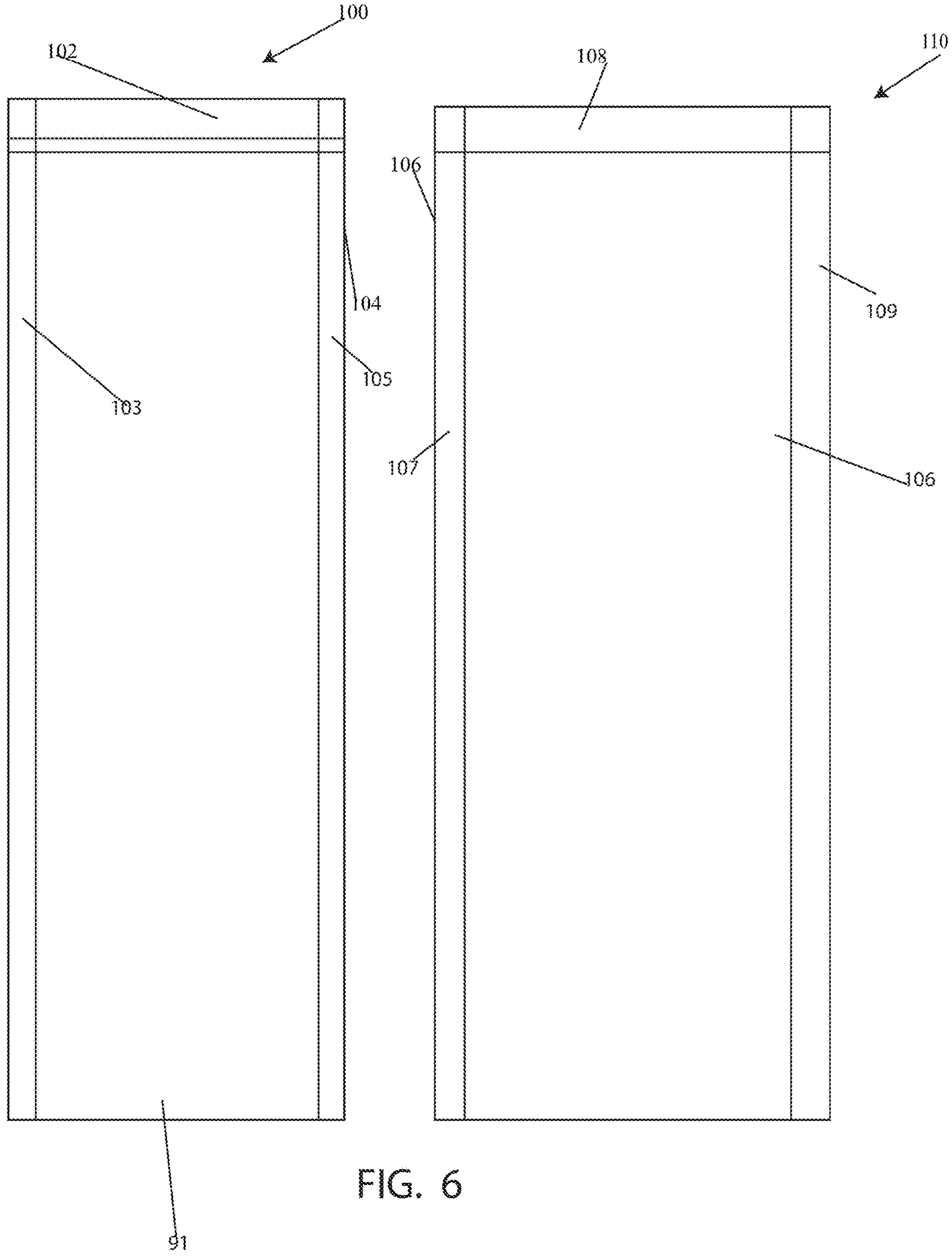
FIG. 6 is a view of sound proofing covers being coupled together.

FIG. 6 is a view of soundproofing covers being coupled together. In this view there is shown a first cover 100 and a second cover 110. The first cover 100 has an upper edge 102 and second cover 110 has an upper edge 108. Each of these covers 100 and 102 have body sections 91 and 105. Each of the covers 100 and 110 has lateral edges 104 and 106 which have hook and loop fastening strips 105 and 107 coupled thereto. These hook and loop fastening strips are configured to couple the blankets together laterally along their long edge. While there are shown hook and loop fastening strips 105 and 107 which are on adjacent sides to each other, there are also oppositely spaced hook and loop fastening strips 103 and 109 which are also on the blankets as well. These fastening strips can be used to fasten to adjacent blankets as well.

Figure 7:
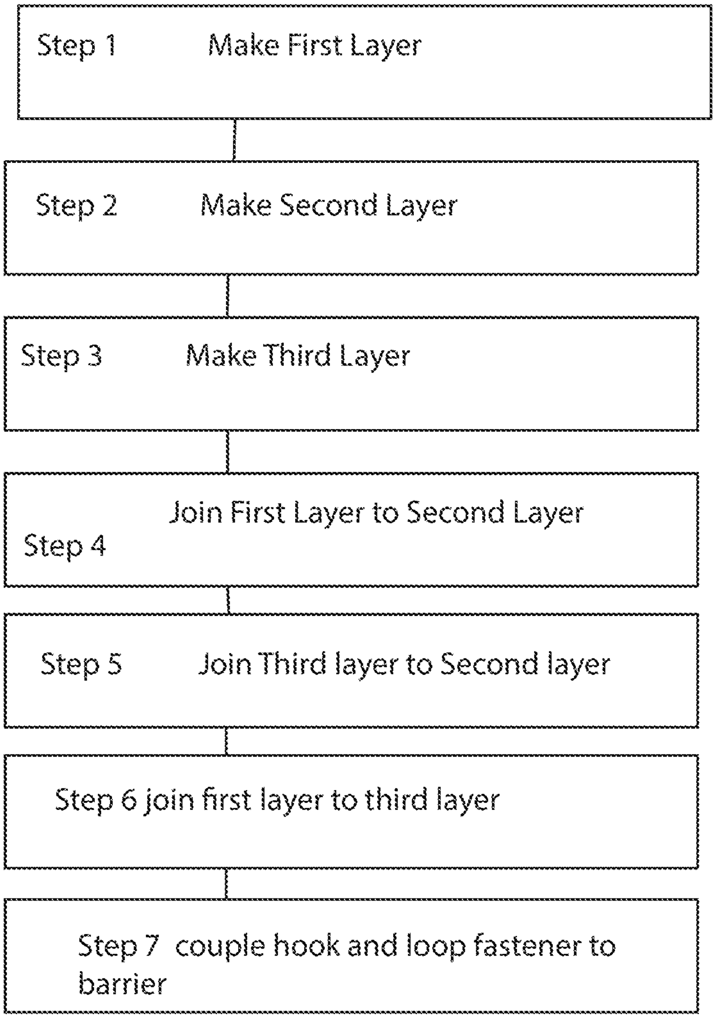
FIG. 7 is a flow chart for making a soundproofing blanket.

FIG. 7 is a flow chart for making a soundproofing blanket such as blankets 100 and 110. The process includes the steps of making a first layer in step 1. Next, the process includes making a second layer in step 2. The second layer can be a padding layer such as a foam layer. In step 3 the process includes making a third layer. The first and third layers can be made from any suitable material such as a polymer such as a polyvinyl chloride material. Next, in step 4 the first layer can be joined to the second layer through any suitable joining process such as through an adhesive. Next, in step 5, the third layer can be joined to the second layer. Next, in step 6 the first layer can be joined to the third layer to create an outer seal which forms a waterproof barrier to fluid coming into the first layer and the third layer. Next in step 7, a hook and loop fastener can be coupled to the barrier. The hook and loop fastener such as hook and loop fasteners 105 and 107 can be in the form of a strip coupled to the barrier.

Thus, there is disclosed both an elevator blanket that can be coupled to an elevator as well as a soundproofing blanket which can be used to soundproof an area such as a construction area. There is also disclosed a process for making a soundproofing barrier. This process can also be used to make the elevator blanket as well.

Accordingly, while at least one embodiment of the present invention have been shown and described, it is to be understood that many changes and modifications may be made thereunto without departing from the spirit and scope of the invention as defined in the appended claims.

What is claimed is:

1. An elevator cover comprising:

a) a body section, said body section having a top edge and a bottom edge and left and right-side edges and an interior portion;

b) a strap coupled to said body section, said strap having a top end coupled to a top edge of said body section and a bottom edge coupled to said interior portion of said body section;

c) a plurality of openings disposed in said strap, said plurality of openings being disposed below said top edge of said body section and extending along said body section and being covered by said body section such that at least one side of said plurality of openings is covered by said body section such said plurality of openings are not visible from at least one side.

2. The elevator cover as in claim 1, wherein said body section comprises three layers comprising a first outer layer made from a polymer, a central padding layer and an opposite outer layer comprising a polymer.

3. The elevator cover as in claim 2, wherein the polymer outer layers are made from a polyvinyl chloride material.

4. The elevator cover as in claim 1, wherein said plurality of openings comprised reinforced openings having stitching to reinforce each opening.

5. The elevator cover as in claim 4, wherein said plurality of openings comprise reinforced openings having a metal ring reinforcing each of said plurality of openings.

6. The elevator cover as in claim 5, wherein said plurality of bell shaped openings comprise reinforced openings having stitching to reinforce each opening.

7. The elevator cover as in claim 6, wherein said plurality of bell shaped openings comprise reinforced openings having a bell-shaped metal boundary coupled to each opening.

8. The elevator cover as in claim 1, wherein said plurality of openings comprise bell shaped openings having an open bottom end configured to receive prongs of an elevator.

9. A process for making a cover comprising the steps of:

making a first layer from a polymer material;

making a middle layer from a foam material;

making a third layer from a polymer material;

joining a first layer to said middle layer; and joining said third layer to said middle layer; and sealing the ends of said first layer to said third layer to protect said middle layer from moisture;

coupling at least one hook and loop fastener to at least one of said first layer and said second layer to form a body section;

coupling a strap to at least one of said first layer and said second layer;

wherein said first layer and said second layer are coupled together at an upper edge and said strap is coupled to said upper edge; and wherein the strap comprises a plurality of holes and wherein at least one side of said holes is covered by said body section such said plurality of openings are not visible from at least one side.

* * * * *